United States Patent [19]
Thomas

[11] 3,774,451
[45] Nov. 27, 1973

[54] FLUID PRESSURE TRANSDUCERS

[75] Inventor: Alan Thomas, Stratford-on-Avon, England

[73] Assignee: Joseph Lucas (Industries) Limited, Birmingham, England

[22] Filed: Apr. 11, 1972

[21] Appl. No.: 242,954

[52] U.S. Cl. .............................................. 73/398 C
[51] Int. Cl. ............................................... G01l 9/12
[58] Field of Search ...................... 73/398 R, 398 C

[56] References Cited
UNITED STATES PATENTS
3,199,355  8/1965  Simon-Suisse .................... 73/398 R
3,257,850  6/1966  Koolman ........................... 73/398 R
3,618,360  11/1971  Cutis ................................. 73/398 R Primary Examiner—Donald O. Woodiel
Attorney—John C. Holman et al.

[57] ABSTRACT

A fluid pressure transducer has a tube of magnetic material which can be subjected internally to a fluid pressure. Electromagnetic stators provide a rotating magnetic field which causes radial displacement of areas of the tube. Sensors surround the tube to detect radial displacement and an associated circuit causes the magnetic field to rotate at the resonant frequency of the tube. This resonant frequency is dependent on the pressure within the tube.

10 Claims, 2 Drawing Figures

FLUID PRESSURE TRANSDUCERS

This invention relates to a fluid pressure transducer and has as an object to provide a fluid pressure transducer in a convenient form.

A fluid pressure transducer in accordance with the invention comprises a sealed tube formed of or coated with ferromagnetic material and having an inlet for fluid, a plurality of electromagnetic means arranged around the tube and each acting to impart radial displacement to the adjacent portion of the tube, a plurality of capacitive sensing devices around the tube each arranged to detect radial displacement of the adjacent portion of the tube and an electrical circuit responsive to signals received from said sensing devices and connected to said electromagnetic means to create a rotating magnetic field, rotating at a frequency at which the tube resonates, said frequency being dependent on the fluid pressure within the tube.

An example of a fluid pressure transducer in accordance with the invention is shown in the accompanying drawings in which.

Figure 1:
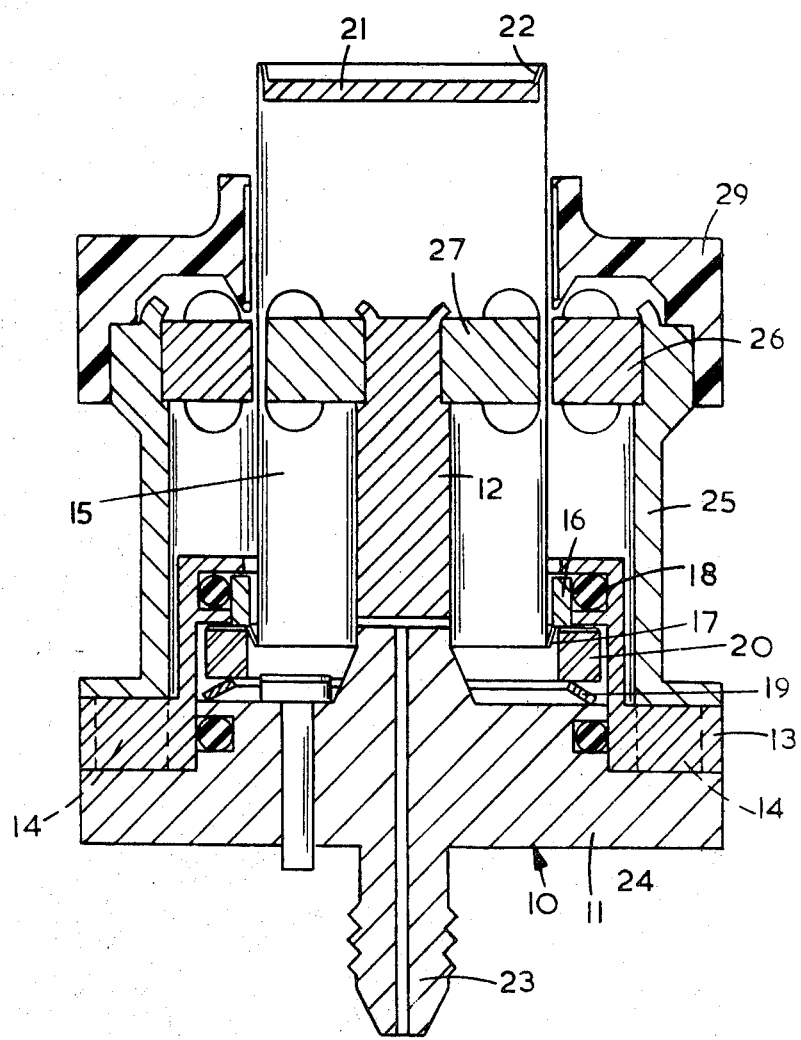
FIG. 1 is a section through the transducer.

The transducer shown includes a body 10 of ferromagnetic material including a disc portion 11 with a coaxial stem portion 12 projecting from it on one side. A ring 13 of non-magnetic material is found on the periphery of the disc portion. This ring has two functions, the first of which is to support a series of permanent magnets 14 which are contained in axially extending bores in an annular flange on the ring 13, with pole faces of the magnets exposed on opposite faces of this flange. All the magnets have their north poles adjacent the disc portion 11 of the body 10.

The other function of the ring 13 is to support a tube 15 formed of a resilient ferromagnetic material or formed of a resilient material coated internally and externally with ferromagnetic material. The ring 13 actually receives an annular member 16 which is sealingly connected to one end of the tube 15 by a thin, flexible frusto-conical web 17. The exterior of the member 16 bears on a sealing ring 18 carried by the ring 13 and abuts against a shoulder on the ring 13. An annular disc spring 19 abutting the body 10 urges a ring 20 against the member 16, thereby holding the member 16 and the tube is sealed by a closure plate 21, connected to the end of the tube by a further thin, flexible, frusto-conical web 22. The body 10 has a fluid pressure inlet 23 communicating with the space between the body 10 and the tube. A further sealing ring 24 interposed between the body 10 and the ring 13 ensures that this space is sealed.

A flange on one end of a sleeve 25 of ferromagnetic material abuts the side of the flange on the ring 13 opposite that abutting the disc portion 10. This sleeve 25 carries at its opposite end an outer stator ring 26 formed internally with a series of grooves defining a like number of pole faces directed towards the outer surface of the tube 15. An inner stator ring 27 is carried on the end of the stem 12 and this ring has a like number of outwardly directed pole faces aligned with the respective pole faces of the outer stator ring 27.

Windings are provided on the stator rings so as to provide, effectively, a plurality of electromagnetic means each comprising an inner and an outer pole face.

In the example shown the windings are of conventional 3-phase 4-pole distribution with twelve stator slots. Each phase winding is made by passing a wire outwardly along one slot, inwardly along a slot spaced around the ring by two intervening slots, outwardly along a slot spaced by a further two slots and so on. The other two phase windings pass through the remaining slots. If direct current were passed along one of the three phase windings two south poles occupying two opposed 90° arcs and two north poles occupying the remaining arcs would be created (ignoring the effect of the permanent magnets). Each phase winding of the inner stator is connected in series to a corresponding one of the phase windings of the outer stator in such a sense that when a north pole is present on any pole face on the inner stator ring, a north pole is also present on the corresponding pole face of the outer ring and vice versa (again ignoring the effect of the permanent magnets).

In fact, the polarising flux produced by the permanent magnets is greater than that produced in use by the windings and is directed radially between the stators. As a result the summation of the polarising and electromagnetic fluxes over one of the 90° arcs mentioned above is increased inside the tube and decreased outside over the same arc, while for the adjacent arcs the reverse is true. This causes an inwardly directed mechanical force to be applied to the tube over the first arc and an outwardly directed force over the adjacent arcs and the application of three phase a.c. to the three windings causes rotation of this force pattern.

For detecting radial displacement of portions of the tube by selective actuation of the electromagnetic means there is provided a plurality of capacitive sensing devices formed by conductive surface areas on the interior surface of an insulative collar 29. In the example described there are twelve such areas.

Figure 2:
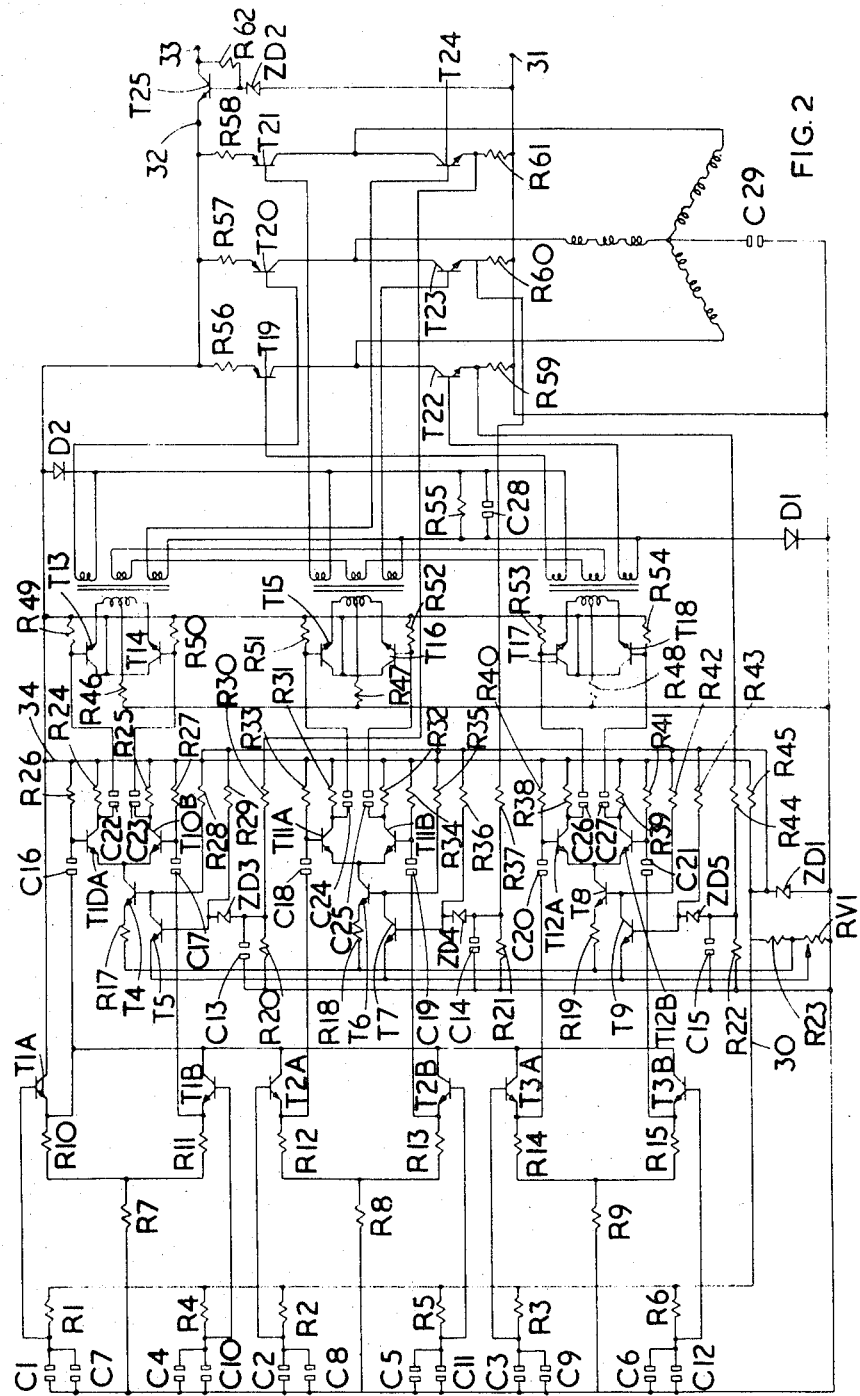
FIG. 2 is an electrical circuit diagram of the transducer.

The conductive surface areas are indicated in FIG. 2 by the right hand plates of the capacitors $C_1$ to $C_{12}$, (numbered consecutively round the tube) the common left hand plate being the tube wall itself. As will be apparent from FIG. 2, the diametrically opposite pairs of the areas are interconnected, since, when the tube is vibrating in the required mode, opposite portions of the tube will have equal radial displacements. These pairs of areas are connected via six resistors R1 to R6 respectively to a common line 30 which is connected to an input terminal 31 of the circuit via a Zener diode ZD1 to maintain a constant potential on line 30. The tube 15 is also connected to terminal 31.

It will be noted that the areas $C_1$ to $C_{12}$ do not appear in FIG. 2 of the drawings in numerical order. This is because the circuit is arranged to provide a three phase output.

The circuit includes a pre-amplifier comprising six n-p-n transistors T1A, T1B, T2A, T2B, T3A and T3B arranged in pairs. Transistors T1A and T1B have their emitters connected together by a pair of resistors R1o, R11 in series and the interconnection of these resistors is connected to the terminal 31 via a resistor R7. Similar arrangements of resistors R8, R12, and R13 and R9, R14 and R15 are provided for the other pairs of transistors of the pre-amplifier. This form of connection senses to suppress even harmonics of the signal picked up. The bases of the transistors are connected respectively to the six pairs of conductive areas constituting the capacitors C1 to C12. The collectors of all six transistors are connected to a supply terminal 32. The six outputs of the pre-amplifier are taken from connections to the emitters of six transistors T1A, T1B, T2A, T2B, T3A and T3B.

The supply terminal 32 is connected to the positive terminal 33 of a d.c. supply via an n-p-n transistor T25 the base of which is connected to the terminal 33 by a resistor R62 and to the terminal 31 by a Zener diode $ZD_2$. This arrangement serves to maintain a constant potential difference between terminals 32 and 31.

The outputs of the pre-amplifier provide the inputs for a main amplifier stage and are coupled by six capacitors C16 to C21 to the bases of six n-p-n transistors T10A, T10B, T11B, T12A and T12B arranged in pairs. The transistors T10A and T10B have their emitters connected together and to the collector of an n-p-n transistor T4. The transistor T4 has its emitter connected via a resistor R17 to the interconnection of a potentiometer RV1 and a resistor R23 connected in series between the terminal 31 and the line 30. The base of transistor T4 is connected by a resistor R28 to the line 30 and to the collector of an n-p-n transistor $T_5$, which has its emitter connected to the variable point of the potentiometer RV1. The base of the transistor $T_5$ is connected by a resistor R29 to the line 30. A Zener diode ZD3 connects the base of the transistor $T_5$ to one connection of a resistor R20 and a capacitor $C_{13}$ in parallel with the resistor R20, the other connection of which is connected to the terminal 31. Similar circuits involve transistors $T_6$ to $T_9$, capacitors C14, C15 Zener diodes ZD4, ZD5 and resistors R18, R19, R20, R21, R22, R35, R36, R42 and R43 are provided for the other two pairs of transistor T11A and T11B and T12A and T12B. The resistor R23 and the potentiometer RV1 are common to all three circuits.

The transistors T10A and T10B have their bases connected via resistors R26 and R27 to a line 34. Resistors R33, R34 and R40 and R41 are similarly associated with the transistors T11A T11B and T12A, T12B respectively. The collectors of the transistors T10A and T10B are connected by resistors R24 and R25 to the line 34. Resistors R31, R32, R38 and R39 serve similarly for the transistors T11A, T11B, T12A and T12B. The line 34 is connected to the line 30 by a resistor R45, The outputs from the main amplifier are taken from the collectors of the transistors T10A to T12B via capacitors C22 to C27 respectively. Three resistors R30, R37 and R44 are connected to the anodes of the Zener diodes ZD3, ZD4 and ZD5 respectively and provide a feed-back to the amplifier as will become clear hereinafter.

The outputs of the main amplifier provide the inputs of a drive stage including six n-p-n transistors T13 to T18 arranged in pairs and transformers X1, X2 and X3 associated respectively with the three pairs of transistors T13 and T14, T15 and T16 and T17 and T18. The bases of the transistors T13 to T17 are connected to the capacitors C22 to C27 respectively and also via resistors R49 to R54 respectively to the terminal 32. The collectors of all of the transistors T13 to T18 are connected to the terminal 32. The emitters of the transistors T13 and T14 are connected to opposite ends of the primary winding of the transformer X1. The emitters of transistors T15, T16, T17 and T18 are similarly associated with the primary windings of transformers X2 and X3. Each such primary winding has a centre tapping and these centre tappings are connected to the terminal 31 by resistors R46, R47 and R48 respectively.

Each transformer has first, second and third secondary windings. The first secondary windings of the three transformers are connected in a closed series circuit, to assist in eliminating the triplen harmonic of the oscillating signal produced in use by the circuit. The second secondary winding of each transformer is connected at one end to the anode of a diode D1 and a third secondary winding of each transformer is connected at one end to the cathode of a diode D2. The anode of the diode D2 is connected to the terminal 32 and the cathode of the diode D1 is connected to the terminal 31. In addition, a resistor R55 and a capacitor C28 is parallel connect the anode of the diode D1 to the cathode of the diode D2. The other ends of the second and third secondary windings provide the output terminals of the drive stage.

The final stage of the circuit is a power stage which includes three p-n-p transistors T19, T20 and T21 with their bases connected respectively to the other ends of the third secondary windings of the transformers X3, X1, and X2. There are also three n-p-n transistors T22, T23 and T24 with their bases connected respectively to the other ends of the second secondary windings of the trnasformers X3, X2 and X1. The collectors of the transistors T19, and T22 are connected to one end of one phase winding of the inner and outer stators and the transistors T20, and T23, T21 and T24 are similarly associated with the other phase windings. The other ends of the three phase windings are connected together and to the terminal 31 by a capacitor C29. Resistors R56, R57 and R58 connect the emitters of the transistors T19, T20 and T21 respectively to the terminal 32 and resistors R59, R60 and R61 connect the emitters of the transistors T22, T23 and T24 respectively to the terminal 31. The feedback connections referred to above are from the emitter of the transistor T22 to the resistor R44, from the emitter of the transistor T23 to the resistor R37 and from the emitter of the transistor T24 to the resistor R30.

The collar 29 is fitted onto the sleeve 25 so that there is a known phase relationship between changes in the radial position of any part of the surface of the tube 15 and the resultant change in forces applied to the tube by electromagnetic means. Thus each pole of the electromagnetic means must be displaced angularly from the two capacitive pick up areas of the collar 29 with which it is electrically in phase. The angle between one such area and the pole may be between 60° and 75° so that the phase of the electrical signal picked up by any pick up area will lag 120° to 150° behind the electrical signal applied to the nearest adjacent pole of the electromagnetic means.

The effect of this phase difference is to provide a travelling displacement wave in the wall of the tube. For any given pressure within the tube the system will resonate at a particular frequency given by the expression.

$$n = a\ (p+b)$$

where $n$ is the frequency
$a$ and $b$ are constants and
$p$ is the pressure in the tube.

The change of the resonant frequency results from stressing of the tube by the internal pressure.

Thus the output of the transducer is a varying frequency and this can be converted into a digital or analogue output in various known ways. For example, the output may be obtained by measuring the time taken for a count of, say, 200 pulses passed by any component of the power stage to be accumulated. This in turn could be translated into an analogue voltage signal by various means.

It will thus be seen that the invention provides a mechanically simple pressure transducer in which the output frequency is linked to the pressure by a simple law. The transducer can be used over a full decade of pressure range and expansion of the tube owing to ballooning is negligible. Any changes in linear dimensions and Young's modulus (on which the frequency is dependent) with temperature are small and self compensatory. The tube itself is the only critically dimensioned or highly stressed member. The tube is of simple geometric form and its production involves only circular machining. Hardening and annealing of the tube are simple in view of the constant thickness of the tube wall.

The pressure applied to the interior of the tube holds the tube wall in tension at all times. Thus no mechanical stops to avoid buckling are required. The tube is mounted at one end only, thus avoiding constraints from the mounting which might vary with temperature. The structure used is light and stiff and is thus substantially immune from the effects of external accelerations and vibrations. There are no flexible diaphragms which are of uncertain area and spring rate, and which can introduce fatigue problems.

The internal volume of the tube does not vary with the amplitude of oscillation. Thus the loading of the fluid on the tube is minimised and the necessity for mechanical filters is avoided.

The use of a three phase drive system ensures maximum power handling capability for the amount of material used and, when combined with the travelling wave system (as opposed to a standing wave system), ensures that the temperature distribution and vibrating stresses are uniform, thus permitting a high fatigue life. The arrangement described for creating the travelling waves i.e. the fixed mechanical advance of stator poles with respect to the pick up areas, ensures that the required phase relationship is obtained at all frequencies. No electronic phase shift arrangement is necessary and changes in the gain of the closed loop are thus avoided. Thus the tube can be driven at maximum amplitude at all frequencies and a good signal to random noise ratio can be obtained. The output is sinusoidal in form and is readily acceptable both for pointer type frequency meters and for use in conjunction with digital computers. The range of frequencies can readily be set to be well above normal power supply frequencies including conventional air craft power supply frequencies.

I claim:

1. A fluid pressure transducer comprising a sealed tube of ferromagnetic material and having an inlet for fluid, a plurality of electromagnetic means arranged around the tube and each acting to impart radial displacement to the adjacent portion of the tube, a plurality of capacitive sensing devices around the tube each arranged to detect radial displacement of the adjacent portion of the tube and an electrical circuit responsive to signals received from said sensing devices and connected to said electromagnetic means to create a rotating magnetic field, rotating at a frequency at which the tube resonates, said frequency being dependent on the fluid pressure within the tube.

2. A fluid pressure transducer as claimed in claim 1 in which each electromagnetic means is associated with a corresponding one of the capacitive pick-up devices angularly spaced around the axis of the tube therefrom so that the electrical signal applied to said electromagnetic means is in phase with the electrical signal picked up by the pick up-device.

3. A fluid pressure transducer as claimed in claim 2 in which the angular spacing between each electromagnetic means and the corresponding pick up device is between 60° and 75°.

4. A fluid pressure transducer as claimed in claim 1 in which the electromagnetic means include polarising magnets and windings such that the field applied by the windings is at all times of smaller magnitude than the field applied by the polarising magnets.

5. A fluid pressure transducer as claimed in claim 4 in which the polarising magnets are permanent magnets.

6. A fluid pressure transducer as claimed in claim 7 in which the electromagnetic means comprises an inner stator mounted within the tube and having twelve outwardly directed pole faces, an outer stator mounted outside the tube and having twelve inwardly directed pole faces adjacent the outwardly directed pole faces respectively, and members of ferromagnetic material carrying said stators and separated by the polarising magnets.

7. A fluid pressure transducer as claimed in claim 6 in which said polarising magnets are located in bores in a ring of non-magnetic material interposed between said members of ferromagnetic material.

8. A fluid pressure transducer as claimed in claim 7 in which said member of ferromagnetic material comprise a body including a disc portion, on which said ring is mounted, and a stem portion, on which said inner stator is mounted, and a sleeve abutting the ring and carrying the outer stator.

9. A fluid pressure transducer as claimed in claim 5 in which the windings are connected in a three phase four pole distribution with each phase winding of the outer stator connected in series with the corresponding phase winding of the inner stator.

10. A fluid pressure transducer as claimed in claim 9 in which diametrically opposite ones of the capacitive sensing devices are connected in parallel.

* * * * *